Nov. 8, 1927.
W. MILLS
1,648,738
CULTIVATOR
Filed Feb. 23, 1926
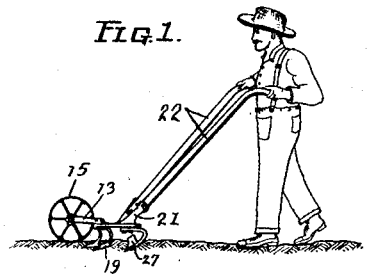
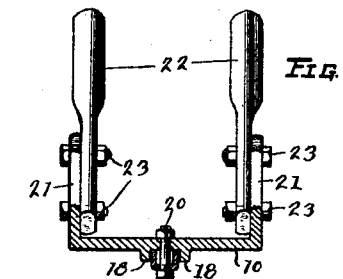
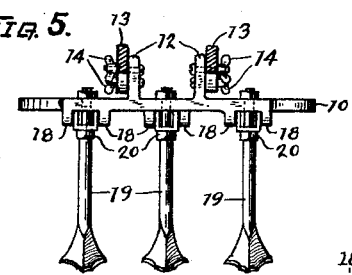
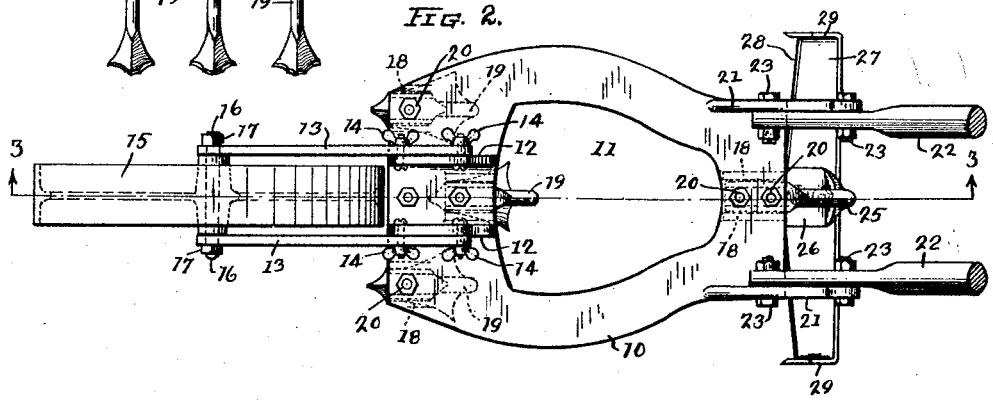
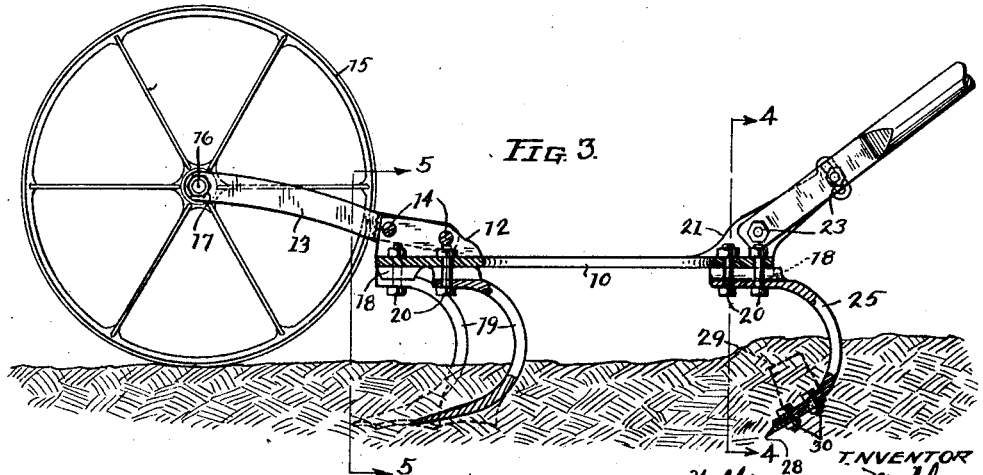
INVENTOR
William Mills
By F. A. Pitts
Attorney Patented Nov. 8, 1927.

1,648,738

UNITED STATES PATENT OFFICE.

WILLIAM MILLS, OF PAINESVILLE, OHIO.

CULTIVATOR.

Application filed February 23, 1926. Serial No. 90,213.

The present invention relates to cultivators, and more particularly to cultivators which not only loosen the earth between the rows of plants, but cut off the weeds at the roots thereof.

An object of this invention is to provide a cultivator which is operated by hand power and which will in one operation loosen the earth between the plants and cut off the weeds at the roots.

Another object of this invention is to provide a device of this character having a plurality of plows on the forward part thereof and which are removably secured to the body frame so as to facilitate the sharpening of the plows.

A further object of this invention is to provide a device of this character which combines a dirt loosener and weed cutter in one implement.

A still further object of this invention is to provide a device of this character which combines a dirt loosener, weed cutter, and a pair of guiding members to determine the proximity of the weed cutter, while it is in operation and buried under the dirt, to the plants which it is desired to leave upstanding.

The above and various other objects and advantages of this invention will in part be described in, and understood from, the following detailed description thereof, wherein:

Fig. 1 is a reduced side elevation of a device constructed according to the present invention and showing the facility with which the device may be operated by hand power.

Fig. 2 is an enlarged fragmentary top view of the device and showing in detail the web construction of the body frame.

Fig. 3 is an enlarged fragmentary side view taken substantially along the lines 3—3 of Fig. 2.

Fig. 4 is an enlarged front view of the weed cutter and taken substantially along the lines 4—4 of Fig. 3 and looking in the direction of the arrows, and Fig. 5 is an enlarged front view of the plows taken substantially along the lines 5—5 of Fig. 3.

Referring to the drawing, the numeral 10 designates a body frame which is preferably of web construction having the central part of the frame removed as at 11 so as to reduce the weight of the frame. The frame 10 is preferably constructed of metal and is substantially rigid. At the forward part of the frame 10 there is provided a plurality of upstanding lugs 12 to which is secured a pair of forwardly extending arms 13 which are in spaced relation to each other. The arms 13 may be secured to the lugs 12 by a plurality of thumb bolts 14 so that the arms 13 may be removed from the frame 10 when it is desired to store the cultivator, and to facilitate the initial shipment thereof.

A guide wheel 15 is mounted at the forward end of the arms 13, and is adapted to turn upon an axle 16 which is mounted through the arms and held in fixed position thereon by a plurality of lock nuts 17.

Beneath the frame 10 and at the forward end thereof there is provided a series of lugs 18 which are mounted on the lower side of the frame 10, preferably in pairs and in spaced relation to each other. The lugs 18 are adapted to receive the upper end of a plow 19 so as to prevent any lateral movement of the same. The plows 19 are secured to the frame 10 between the lugs 18 by bolts 20 or the like, the bolts 20 holding the plows 19 against the lower side of the frame 10. When the plows 19 become dulled through use they may be easily removed by unloosening the bolts 20 and removing the plows from the frame 10. The removability of the plows also makes it possible to pack for shipment the entire device into a small compact package. The outside plows 19 are preferably mounted on the frame forwardly of the central plow, so as to provide a pair of leader plows and a trailing plow in somewhat the same manner as gang plows are mounted.

At the rear end of the frame 10 there is provided a pair of upstanding flanges 21, which are adapted to removably receive a pair of handles 22, which are secured to the flanges 21 by a plurality of bolts 23 or the like. The handles 22 are preferably mounted on the frame 10 at an obtuse angle thereto. It will of course be understood that with each individual who may operate this device, the exact angle of the handles should be varied, and to provide for this variation the outer end of the flange 21 is provided with an arcuate opening through which a bolt 23 or the like is adapted to pass.

In substantially the center of the frame 10 and at the rear end thereof, there is provided a pair of spaced lugs 18, which are adapted to receive a downwardly extending arcuate arm 25, the lower end 26 of which is preferably flattened out to removably receive a weed cutter 27. The weed cutter 27 is mounted on the arm 25 transversely of the frame 10, and the lower end of the weed cutter 27 is preferably on a plane with the plows 19 at the forward end of the frame 10. The weed cutter 27 preferably has a sharpened forward edge 28 which is inclined rearwardly from the center thereof.

A pair of guide members 29 are mounted at opposite ends of the weed cutter 27 and are upstanding therefrom, so that when the weed cutter 27 is moved forwardly the guides 29 protrude and extend above the ground. The guides 29 therefore indicate the exact position of the weed cutter 27 beneath the soil so that the operator will not unknowingly cut the roots of the cultivated plants. The forward edges of the guides 29 are preferably sharpened with the beveled edge extending inwardly so that the guides will not pull the weed cutter 27 to one side. The weed cutter 27 may be removably secured to the flattened end 26 of the arm 25 by a plurality of bolts 30 or the like.

In the operation of this device the plows 19 are mounted on the frame 10 so that their lower ends are at approximately the depth of the roots of the weeds below the bottom of the wheel 15. When the device is pushed forwardly, the plows 19 cut up the soil so that it is in a loose condition, and the weed cutter 27 follows up the work of the plows 19 by lifting upwardly all of the loosened soil, the sharpened edge 28 of the weed cutter 27 cutting off the roots of the weeds. The guides 29 of course follow along with the weed cutter, and show the depth of the edge 28 and also determine the exact position of the cutter 27, so that the cultivated plants will not be uprooted and cut off by mistake.

It is of course understood that various changes and modifications may be made in the details of construction and design of the above specifically described embodiment of the invention without departing from the spirit thereof, such changes and modifications being restricted only by the scope of the following claim:

What is claimed is:

In a cultivator, a frame plate broad at its forward end and relatively narrow at its rear end, said plate having upper and lower pairs of integral lugs, one pair of said upper lugs disposed on the broad forward end of the frame plate and having transverse openings adapted to receive anchoring means for a gauge wheel structure; a second pair of upper lugs having transverse openings disposed on the narrow rear end of the frame plate for carrying a pair of handles, the third pair of lower lugs disposed on the central lower side of the narrow end, three pairs of lugs on the lower side of the broad end, two of said latter pairs being at the side and one pair centrally and rearwardly disposed with reference to the other two pair, all the lower pairs of lugs having centrally disposed openings in the plate adapted to receive anchoring means for earth working tools.

In testimony whereof, I have hereunto subscribed my name.

WILLIAM MILLS.